US010983482B2

(12) United States Patent
Koh et al.

(10) Patent No.: US 10,983,482 B2
(45) Date of Patent: Apr. 20, 2021

(54) ELECTRONIC DEVICES WITH DISPLAY BURN-IN MITIGATION

(71) Applicant: Apple Inc., Cupertino, CA (US)

(72) Inventors: Tae-Wook Koh, Los Gatos, CA (US); Yiqiang Nie, San Francisco, CA (US); Yifan Zhang, San Carlos, CA (US); Giovanni M. Agnoli, San Mateo, CA (US); Paul S. Drzaic, Morgan Hill, CA (US); David A. Doyle, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/277,842

(22) Filed: Feb. 15, 2019

(65) Prior Publication Data

US 2020/0218204 A1 Jul. 9, 2020

Related U.S. Application Data

(60) Provisional application No. 62/788,064, filed on Jan. 3, 2019.

(51) Int. Cl.

| | |
|---|---|
| ***G06F 1/00*** | (2006.01) |
| ***G04G 9/00*** | (2006.01) |
| ***G09G 3/20*** | (2006.01) |
| ***G09G 3/3225*** | (2016.01) |

(52) U.S. Cl.

CPC ......... *G04G 9/0088* (2013.01); *G09G 3/2003* (2013.01); *G09G 3/3225* (2013.01); *G09G 2310/08* (2013.01); *G09G 2320/046* (2013.01)

(58) Field of Classification Search

CPC .......... G09G 3/32; G09G 3/3275; G09G 5/10; G09G 5/14; G06F 3/048; G04G 9/00

See application file for complete search history.

(56) References Cited

U.S. PATENT DOCUMENTS

| | | | |
|---|---|---|---|
| 10,068,551 | B1 | 9/2018 | Choi et al. |
| 10,079,000 | B2 | 9/2018 | Zheng et al. |
| 10,089,959 | B2 | 10/2018 | Jangda et al. |
| 2005/0018046 | A1 | 1/2005 | Tsuzuki |
| 2006/0055335 | A1 | 3/2006 | Shingai et al. |
| 2007/0229664 | A1 | 10/2007 | Nagaoka |

(Continued)

FOREIGN PATENT DOCUMENTS

| | | |
|---|---|---|
| JP | 2018514090 | 5/2018 |
| KR | 20070025292 A | 3/2007 |

*Primary Examiner* — Michael A Faragalla
(74) *Attorney, Agent, or Firm* — Treyz Law Group, P.C.; G. Victor Treyz; Joseph F. Guihan

(57) ABSTRACT

An electronic device such as a wristwatch device or other device may have a display. The display may be used to continuously display information such as watch face information. A watch face image on the display may contain watch face elements such as watch face hands, watch face indices, and complications. To reduce burn-in risk for watch face elements, control circuitry in the electronic device may impose burn-in constraints on attributes of the watch face elements such as peak luminance constraints, dwell time constraints, color constraints, constraints on the shape of each element, and constraints on element style. These constraints may help avoid situations in which static elements such as watch face indices create more burn-in than dynamic elements such as watch face hands.

3 Claims, 8 Drawing Sheets

(56) References Cited

U.S. PATENT DOCUMENTS

| | | | |
|---|---|---|---|
| 2014/0375704 | A1 | 12/2014 | Bi et al. |
| 2015/0161936 | A1 | 6/2015 | Jang |
| 2015/0185703 | A1* | 7/2015 | Tanaka ................. G04G 99/006 368/239 |
| 2015/0348476 | A1 | 12/2015 | Yeo et al. |
| 2016/0125781 | A1 | 5/2016 | Yang |
| 2017/0004753 | A1 | 1/2017 | Kim et al. |
| 2017/0011210 | A1 | 1/2017 | Cheong et al. |
| 2017/0160898 | A1* | 6/2017 | Lee ................... H04W 52/0254 |
| 2018/0286356 | A1* | 10/2018 | Jiang ......................... G09G 5/36 |
| 2019/0278323 | A1* | 9/2019 | Aurongzeb ......... H01L 27/3267 |

* cited by examiner

ELECTRONIC DEVICES WITH DISPLAY BURN-IN MITIGATION

This application claims priority to U.S. provisional patent application No. 62/788,064 filed Jan. 3, 2019, which is hereby incorporated by reference herein in its entirety.

FIELD

This relates generally to electronic devices, and, more particularly, to electronic devices with displays.

BACKGROUND

Electronic devices such as televisions contain displays. Some displays such as plasma displays and organic light-emitting diode displays may be subject to burn-in effects. Burn-in may result when a static image is displayed on a display for an extended period of time. This can cause uneven wear on the pixels of the display. If care is not taken, burn-in effects can lead to the creation of undesired ghost images on a display.

SUMMARY

An electronic device such as a wristwatch device or other device may have a display. The display may be used to display information such as watch face information. For example, a watch face image may be displayed continuously on the display during operation of the wristwatch device.

The watch face image on the display may contain watch face elements such as watch face hands, watch face indices (tick marks), and watch face complications. To help avoid burn-in effects associated with displaying the watch face elements, control circuitry in the electronic device may impose burn-in constraints on attributes of the watch face elements. In response to these constraints, the control circuitry may perform burn-in mitigation operations that help reduce burn-in effects.

The constraints that are imposed may include peak luminance constraints, dwell time constraints, color constraints, constraints on the shapes and sizes of displayed elements, and constraints on element style. These constraints may help equalize pixel wear across the display and thereby avoid situations in which static elements such as watch face indices or complications create more burn-in than dynamic elements such as watch face hands. If desired, pixel usages history may be taken into account when performing burn-in mitigation operations.

DETAILED DESCRIPTION

Electronic devices may be provided with displays. For example, a wearable device such as a wristwatch or other electronic device may have an organic light-emitting diode display. It may be desirable to use a display such as an organic light-emitting diode display to display time information, date information, and/or other information in a persistent fashion. For example, it may be desirable to provide a wristwatch or other electronic device with an always-on date and/or an always-on time function.

In arrangements in which content such as a watch face image is displayed for prolonged periods of time, there may be a risk for burn in. To reduce burn-in risk, constraints may be imposed on the attributes of the elements in the watch face image. For example, a maximum dwell time constraint may be imposed for each of the elements in a watch face image. In accordance with this constraint, the maximum amount of time that a watch face element can dwell in the same location on the display is limited.

Some watch face elements such as watch hands must move as a function of time and are therefore naturally associated with modest dwell times. Other watch face elements, such as hour and minute watch face indices are normally static. To ensure that the normally static indices in a watch face image do not remain in a given location for longer than permitted, the radial positions of the indices may be shifted slightly over time. By altering the normal behavior of the indices in this way, burn-in risk for the indices can be reduced to an acceptable level.

In addition to imposing a maximum dwell time constraint, burn-in constraints may be imposed on watch face image elements such as color constraints, constraints on luminance, constraints on watch face element style (e.g., whether an element is displayed as a solid or outlined item), etc. Control circuitry in a device may display watch face images while performing burn-in mitigation operations to ensure that the attributes of the displayed watch face elements satisfy the burn-in constraints. In this way, watch face images can be displayed continuously or other prolonged periods of time with reduced burn-in risk. If desired, pixel usage history, which is indicative of pixel wear and potential burn-in risk, can be taken into account when performing burn-in mitigation operations. For example, areas of high pixel wear may be associated with lower permitted peak luminance values than areas of lower pixel wear, so brighter watch face elements can be located in the areas of less wear and/or watch face elements can dwell for longer in these areas.

Figure 1:
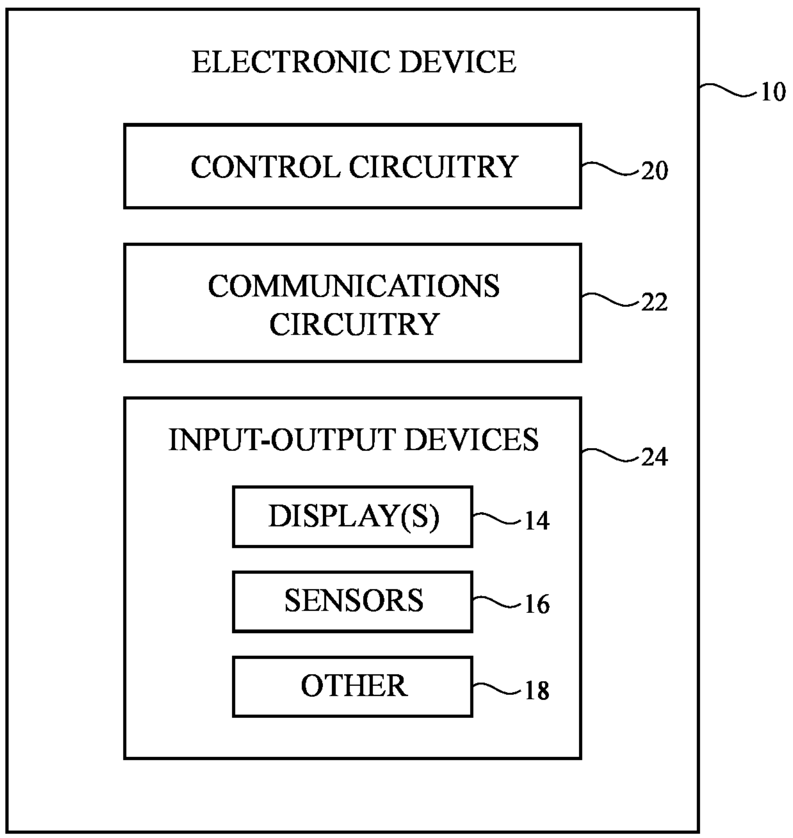
FIG. 1 is a schematic diagram of an illustrative electronic device in accordance with an embodiment.

A schematic diagram of an illustrative electronic device having a display is shown in FIG. 1. Device 10 may be a cellular telephone, tablet computer, laptop computer, wristwatch device or other wearable device, a television, a stand-alone computer display or other monitor, a computer display with an embedded computer (e.g., a desktop computer), a system embedded in a vehicle, kiosk, or other embedded electronic device, a media player, or other electronic equipment. Configurations in which device 10 is a wristwatch are sometimes described herein as an example. This is illustrative. Device 10 may, in general, be any suitable electronic device with a display.

Device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use a display and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment over a wireless link (e.g., circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link). Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display 14. Display 14 may be an organic light-emitting diode display, a liquid crystal display, an electrophoretic display, an electrowetting display, a plasma display, a microelectromechanical systems display, a display having a pixel array formed from crystalline semiconductor light-emitting diode dies (sometimes referred to as microLEDs), and/or other display. Configurations in which display 14 is an organic light-emitting diode display are sometimes described herein as an example.

Display 14 may have an array of pixels configured to display images for a user. The display pixels may be formed on one or more substrates such as one or more flexible substrates (e.g., display 14 may be formed from a flexible display panel). Conductive electrodes for a capacitive touch sensor in display 14 and/or an array of indium tin oxide electrodes or other transparent conductive electrodes overlapping display 14 may be used to form a two-dimensional capacitive touch sensor for display 14 (e.g., display 14 may be a touch sensitive display).

Sensors 16 in input-output devices 24 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 2:
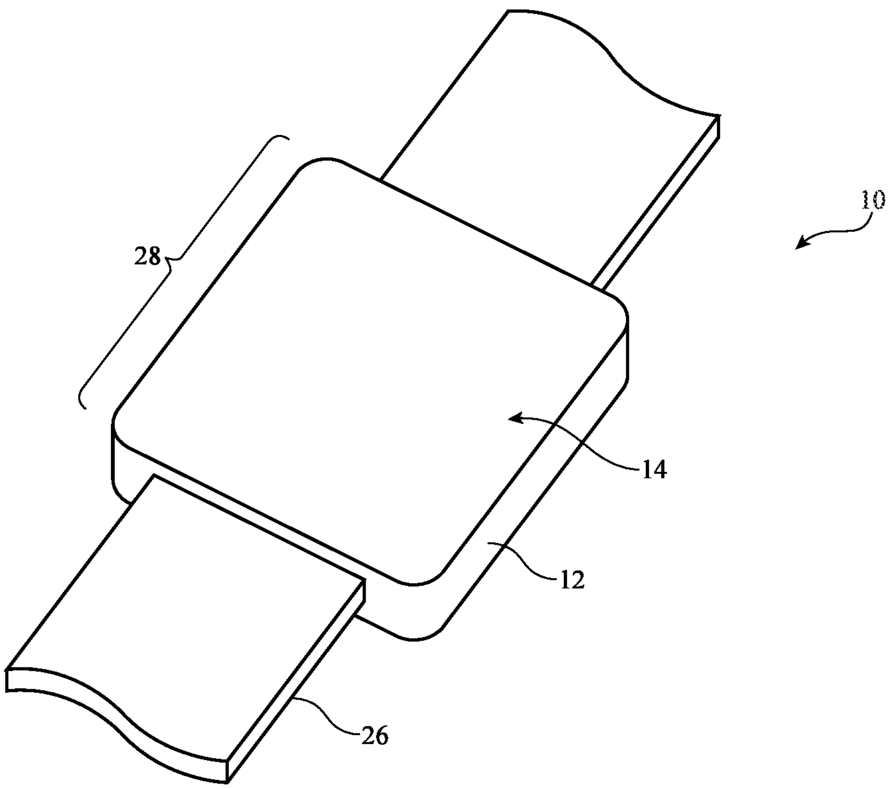
FIG. 2 is a perspective view of an illustrative electronic device with a display in accordance with an embodiment.

FIG. 2 is a perspective view of electronic device 10 in an illustrative configuration in which device 10 is a wearable electronic device such as a wristwatch. As shown in FIG. 2, device 10 may have a band such as band 26 and a main unit such as main unit 28 that is coupled to band 26. Display 14 may cover some or all of the front face of main unit 28. Touch sensor circuitry such as two-dimensional capacitive touch sensor circuitry may be incorporated into display 14. Band 26, which may sometimes be referred to as a strap, wrist strap, watch strap, wrist band, or watch band, may be used to secure main unit 28 to the wrist of a user.

Main unit 28 may have a housing such as housing 12. Housing 12 may form front and rear housing walls, sidewall structures, and/or internal supporting structures (e.g., a frame, midplate member, etc.) for main unit 28. Glass structures, transparent polymer structures, image transport layer structures, and/or other transparent structures that cover display 14 and other portions of device 10 may provide structural support for device 10 and may sometimes be referred to as housing structures. For example, a transparent housing portion such as a glass or polymer housing structure that covers and protects a pixel array in display 14 may serve as a display cover layer for the pixel array while also serving as a housing wall on the front face of device 10. The portions of housing 12 on the sidewall and rear wall of device 10 may be formed from transparent structures and/or opaque structures.

Device 10 of FIG. 2 has a rectangular outline (rectangular periphery) with four rounded corners (e.g., the front face of device 10 may be square). If desired, device 10 may have other shapes (e.g., circular shape, rectangular shapes with edges of unequal lengths, and/or other shapes). The configuration of FIG. 2 is illustrative.

If desired, openings may be formed in the surfaces of device 10. For example, openings may be formed to accommodate speakers, cable connectors, microphones, buttons, and/or other components. Openings such as connector openings may be omitted when power is received wirelessly or is received through contacts that are flush with the surface of device 10 and/or when data is transferred and received wirelessly using wireless communications circuitry in circuitry 22 or through contacts that are flush with the exterior surface of device 10.

It may be desirable to display information on display 14 for prolonged periods of time. For example, when device 10 is a wristwatch, it may be desirable to continuously or nearly continuously display a watch face image on display 14 whenever device 10 is in operation and being worn by a user. By displaying the watch face image for prolonged periods of time (e.g., in an uninterrupted stretch of at least 100 seconds, at least 10 minutes, at least 100 minutes, at least 10 hours, at least 100 hours, less than 50 hours, or other extended time period), a user of device 10 will be conveniently provided with watch face information and will not need to make any particular motions (e.g., a wrist motion) to turn on the watch face (e.g., the watch face may be displayed continuously rather than momentarily in response to user physical activity measured with an accelerometer or other motion sensor). The presence of the continuously displayed watch face image on device 10 may also enhance the appearance of device 10.

When displaying a watch face image for an extended period of time, however, there is a risk of burn-in effects in which the pixels of display 14 degrade due to wear. Pixel wear may be experienced, for example, when a pixel is operated at a high luminance for an extended period of time. Pixel wear may be experienced differently for different colors of subpixels. For example, a red pixel (sometimes referred to as a red subpixel) may wear at a different rate than blue and green pixels (subpixels). Pixel wear may be non-linear as a function of output light intensity. For example, a pixel operated at a luminance L for a time period T may experience more than twice as much wear as a pixel operated at a luminance L/2 for the time period T. Pixel wear may be cumulative as a function of operating time. For example, a pixel that is operated at three successive disjoint time periods T may wear the same amount as a pixel that is operated for a single period of length 3T.

Based on these considerations, visible burn-in effects can be reduced or eliminated. For example, burn-in effects can be reduced or eliminated by limiting the cumulative time that pixels are turned on and/or by avoiding excessive pixel operation at high output light intensities. In the context of an always-on display such as a display that continuously displays a watch face image (clock face image) with watch face image elements such as hands, indices, and complications (e.g., complications formed from selectable or non-selectable icons or other content), burn-in risk can be reduced by imposing burn-in constraints on the attributes of the watch face image such as constraints on the attributes of indices, hands, complications, and other watch face elements.

Figure 3:
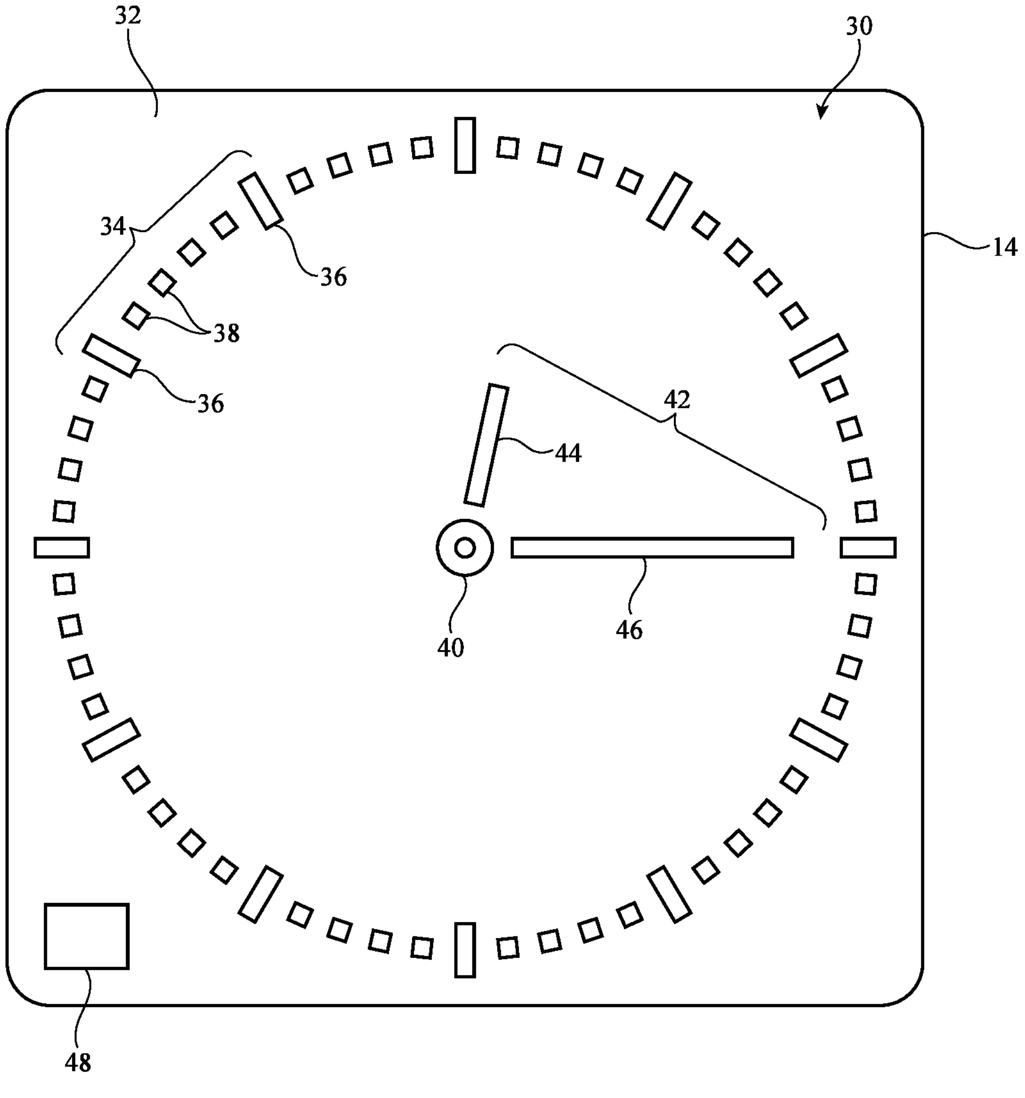
FIG. 3 is a diagram of an illustrative watch face displayed on a display in accordance with an embodiment.

Consider, as an example, the illustrative watch face image of FIG. 3. As shown in FIG. 3, watch face image 30 may include a background such as background 32. Background 32 may be black, may have a non-neutral color (e.g., red, green, blue, yellow, etc.), may be gray, may be white, may contain a static or moving image such as a picture of a person, a graphic image (e.g., a cartoon), a camera image, a decorative pattern, or other suitable background content. Use of dark background colors such as black or dark gray may help reduce power consumption.

Watch face image 30 may also contain time indices 34 such as hour indices 36 and minute indices 38. Indices 34, which may sometimes be referred to as tick marks, may be used to help denote the locations of the hours of the day. If desired, indices 34 may contain associated hour markers (e.g., "3" to label the 3:00 tick mark on the watch face, etc.). Watch face image 30 has hands 42 such as minute hand 46, hour hand 44, and, if desired, a second hand. Hands 42 move around central watch face element 40 (e.g., in a clockwise direction) so that the positions of hands 42 can be compared to the positions of indices 34 and thereby used to indicate the current time of day. If desired, watch face image 30 may also contain complications such as complication 48 or other ancillary content. Complication 48 may include weather information, a selectable icon, temperature information, a countdown timer, a selectable button for launching an application, flight status information, stock prices, sports scores, and/or other information. This information may be displayed at the corners of display 14, in the center of display (e.g., inside the ring formed by indices 34), and/or at other suitable locations within watch face image 30.

Burn-in risk for the illustrative watch face image 30 of FIG. 3 can be reduced by applying burn-in reduction constraints to the attributes of watch face elements in watch face image 30. For example, burn-in risk can be reduced by limiting watch face element dwell times. Hands 42 are in motion and therefore do not linger for prolonged periods of time over any given pixel or set of pixels relative to more persistent watch face elements such as indices 34. To reduce the burn-in risk associated with indices 34 (e.g., to reduce index burn-in risk to an amount comparable to the amount of burn-in risk associated with hands 42 or other suitable lowered amount), control circuitry 20 can be configured to dynamically adjust the locations of indices 34 during operation of device 10. To ensure that indices 34 can be used to accurately assess the location of hands 42 while still moving indices to different pixel locations during operation, control circuitry 20 may, for example, shift the radial position of indices 34 back and forth. This repeated radial inward and outward movement spreads out the pixel wear due to indices 34 over a wide range of pixels and helps reduce the risk that ghost images of indices 34 will burn in. The size and/or shape or other attributes of indices 34 may also be altered dynamically to reduce burn-in risk. If desired, the overall watch face artwork that is displayed on display 14 (e.g., hands, indices, and/or other watch face elements) may be scaled in size. For example, always-on artwork may be adjusted to have 95% of its nominal (100%) size to help reduce burn-in effects. Watch face scaling operations to reduce burn-in may be performed gradually and/or may be performed in one or more steps, may be performed when threshold dwell times are exceeded, may be performed at predetermined times (e.g., according to a schedule), may be performed continuously, and/or may otherwise be performed to ensure that burn-in reduction constraints are satisfied. During scaling operations, the locations of indices 34 may move inwardly to reduce burn-in risk and the sizes of other watch face elements may optionally be scaled (e.g., the sizes of hands 42 may be scaled). With this approach, the overall size of non-black portions of the watch face image on display 14 are dynamically scaled in size. Watch faces with other layouts may also be scaled or otherwise dynamically altered to reduce burn-in risk. The use of artwork size scaling for burn-in-risk mitigation in the arrangement of FIG. 3 is illustrative.

In general, any suitable burn-in reduction constraints can be applied. For example, a constraint such as a maximum luminance value may be applied to a watch face image element attribute such as watch face image element luminance (e.g., pixel luminance in the watch face element). This prevents excessive light emission and wear from pixels that are experiencing elevated wear or that would otherwise be likely to experience elevated wear. As another example, a position-based constraint (sometimes referred to as a dwell time constraint) may be imposed to limit the amount of dwell time that can be associated with a watch face image element at a given position on display 14 (e.g., at a given pixel). Complications such as complication 48 of FIG. 3 may exhibit reduced burn-in risk if their position is periodically moved (e.g., if a maximum dwell time is imposed for a complication or part of a complication in a given region of display 14). As another example, central watch face element 40 may be provide with a ring shape and the diameter of the ring can be periodically expanded and contracted (scaled to a smaller size) to avoid concentrating pixel wear on the pixels at a particular radius from the center of the watch face.

If desired, attributes such as luminance and dwell time can be evaluated together. For example, the constraints imposed on image 30 may specify that low intensity image elements can linger for longer periods of time in a given position than higher intensity image elements.

Another constraint that can be applied relates to pixel color. Pixels will wear out less quickly if subpixels of different colors are used selectively. For example, consider a pixel with red, green, and blue subpixels. This pixel will experienced reduced burn-in risk if the red, green, and blue subpixels are each used for a time period T in sequence rather than turning on the red, green, and blue subpixels together for time period 3T. Color is therefore a watch face element attribute that can be taken into consideration when imposing constraints to reduce burn-in risk.

In addition to imposing constraints on attributes such as luminance, position, and color, watch face element attributes such as watch face element style can be considered. For example, each rectangular index 34 can be presented in a solid style (e.g., index 32 can be a solid white rectangle) or an outline style (e.g., index 32 can be a thin rectangular white line). Fewer pixels are illuminated using the outline style, so the use of the outline style may help reduce burn-in risk.

These constraints and/or other constraints can be imposed in any suitable combination to help reduce burn-in risk associated with continuous presentation of watch face image 30 on face 40.

Figure 4:
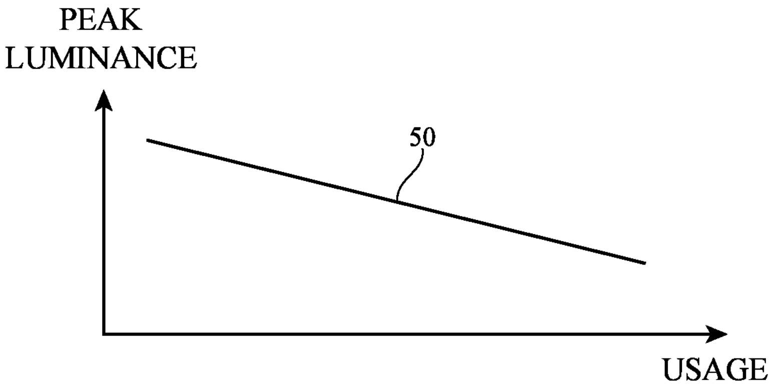
FIG. 4 is a graph showing how maximum display luminance can be decreased as a function of usage in accordance with an embodiment.

FIG. 4 is a graph showing how a peak luminance constraint may be imposed on the content of watch face image 30 as a function of pixel usage. Curve 50 shows how the amount of luminance permitted for a given pixel (or set of pixels) may decrease as a function of usage of that pixel (or set of pixels). During operation of device 10, memory in control circuitry 20 (e.g., system memory associated with an application processor, graphics processing unit memory, display driver integrated circuit memory, and/or other storage in device 10) may be used to maintain usage history information for the pixels of display 14. A variety of content may be displayed on the pixels of display 14 during operation of device 10. As a result, some pixels are used more than others. Heavily used pixels will experience more wear and will be more susceptible to burn-in risk. The risk of undesired ghosting on display 14 can therefore be minimized by reducing the peak luminance permitted for pixels based on their usage. Pixels that have been heavily used can be limited to lower luminance values than lightly used pixels. In this way, the rate of future wear on the most used pixels can be reduced. This helps balance out pixel wear across display 14.

Pixel usage can be measured using any suitable metric. As an example, pixel usage values can be weighted as a function of luminance (e.g., a non-linear wear function or other suitable function may be used to gauge pixel wear as a function of luminance) and usage time (e.g., a linear function or other suitable function can be used to gauge pixel wear as a function of usage time). Peak luminance can be restricted on a per-pixel basis or by tracking pixel wear in blocks of multiple pixels (e.g., to identify which sectors of a display have pixels with the most wear). If desired, usage history information may be used in selecting other appropriate burn-in-mitigation constraints for display 14. For example, the maximum amount of time that a watch face element is allowed to dwell in a particular location on display 14 can be selected based on usage history for that location. If the pixels in a given location have been subjected to heavy wear, for example, control circuitry 20 can impose a lower maximum dwell time for that location, so that watch face elements are moved away from that location when possible.

Figure 5:
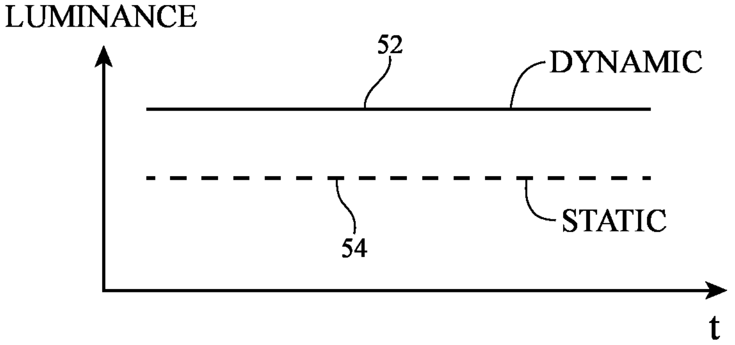
FIG. 5 is a graph showing how the luminance of static and dynamic portions of a watch face image can be controlled in accordance with an embodiment.

Another way in which burn-in risk can be reduced involves adjusting watch face image elements based on element type. As an example, persistent watch face elements such as indices, complications, central points (e.g., a dots or rings indicating the center of the watch face around which the hands rotate), or other persistent watch face elements may be associated with elevated burn-in risk because these elements can be maintained at fixed locations permanently or for extended periods of time (e.g., minutes, hours, etc.), whereas non-persistent watch face elements such as watch hands (minute, hour, and second hands) are in constant motion and therefore do not exhibit such elevated burn-in risk. Because persistent elements (sometimes referred to as static elements, non-moving elements, or fixed-position elements) are associated with more burn-in risk than non-persistent elements (sometimes referred to as dynamic or moving elements), burn-in risk can be minimized by limiting the luminance (e.g., the peak luminance) of persistent elements to a lower value than the non-persistent elements. As shown in FIG. 5, for example, in which pixel output luminance is plotted as a function time for illustrative persistent and non-persistent elements, control circuitry 20 may present persistent elements such as watch face indices using a lower luminance (curve 54) than non-persistent elements such as watch hands (curve 52). This helps balance wear on the pixels of display 14 from persistent and non-persistent elements and therefore reduces burn-in risk (particularly burn-in risk associated with the elements displayed at non-persistent locations). Non-persistent watch face image elements may be brighter than non-persistent elements to enhance visibility. For example, watch hands 42 of FIG. 3 may be brighter than indices 34 of FIG. 3 because the movement of watch hands 42 reduces burn-in risk.

Figure 6:
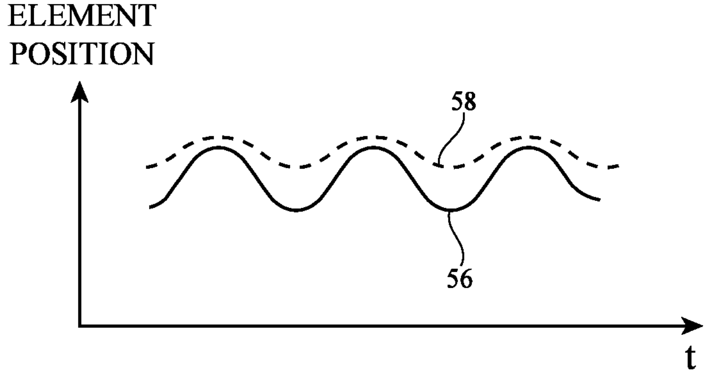
FIG. 6 is a graph showing how the positions of watch face elements such as indices in a watch face image can be repeatedly shifted radially back and forth or can otherwise be moved to reduce burn-in risk in accordance with an embodiment.

If desired, burn-in risk for elements that might be fixed in some watch face designs can be reduced by gradually shifting the positions of those elements back and forth over time. Consider, as an example, indices 34. Watch indices are typically displayed in fixed positions (radially and circumferentially) to serve as time reference points for hands 42. However, this reference functionality will not be significantly disturbed if the radial positions of indices 34 are slowly varied (e.g., at a rate that is imperceptible or barely perceptible to the naked eye) while maintaining fixed circumferential positions (e.g., fixed hour locations). As a result, the radial positions and/or other characteristics of indices 34 (e.g., style, diameter, color, etc.) can be varied to avoid situations in which indices 34 linger for more than a predetermined dwell time in a particular location. This type of arrangement is illustrated in the graph of FIG. 6. Curve 56 shows how the position of an element (e.g., the radial distance of each index 34 from the center of watch face image 30) may be varied as a function of time. This helps spread out pixel wear radially and avoids creating burnt-in index ghost images on watch face image 30. In some scenarios, hands 42, complications, or other displayed content may create more wear on the watch face at smaller radial distances from the center of image 30 than at larger radial distances. This may be reflected in the pixel usage history for display 14. In this type of scenario, the radial distance of indices 34 can be limited to larger values as shown by curve 58 (e.g., to keep indices 34 from overlapping the more worn portions of display 14 that are located near the center of image 30). The use of moving indices 34 is illustrative. In general, any suitable watch face elements (e.g., watch face elements that tend to be static and that are normally displayed at fixed positions) can be shifted back and forth in position to prevent excessive dwell times. Other watch face element attributes such as watch face element size and shape may also be varied dynamically to reduce pixel wear.

Figure 7:
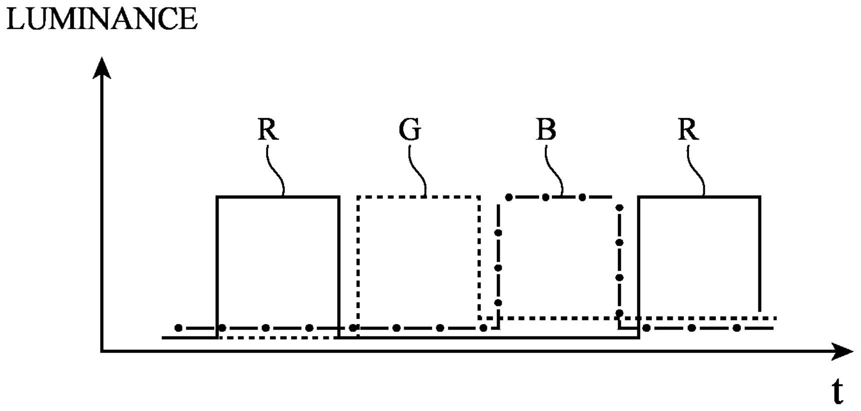
FIG. 7 is a graph showing how the color of displayed content such as watch face elements can be varied to reduce burn-in risk in accordance with an embodiment.
Figure 8:
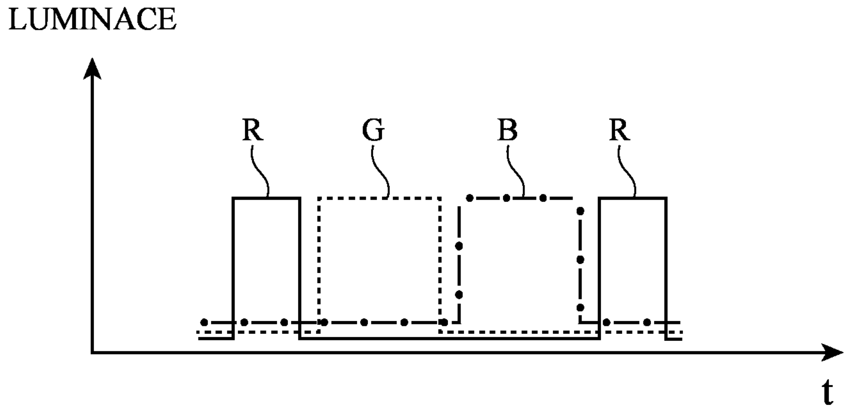
FIG. 8 is a graph showing how displayed colors may be varied based at least partly on pixel degradation information for pixels of different colors in accordance with an embodiment.

FIGS. 7 and 8 illustrate how constraints can be applied to the displayed color of watch face elements to help reduce burn-in risk. In the example of FIG. 7, the color of hands 42, indices 34, complication 48, central element 40, and/or other watch face element(s) is being varied as a function of time. In the example of FIG. 7, the color of the watch face element is being cycled repeatedly through red, green, and blue colors and each different color is used for an equal amount of time. This helps spread pixel wear across subpixels of different colors, so that particular subpixels are not excessively worn. In the example of FIG. 8, the red subpixels of the displayed element have experienced more wear than the green and blue pixels (e.g., as indicated by usage history information maintained by control circuitry 20), so control circuitry 20 is favoring the green and blue colors for the watch face element over the red color (e.g., green and blue colors are being used more in the displaying of watch face elements than red). In this way, wear for the green and blue pixels will be increased relative to the red pixels. This approach can help equalize pixel wear across all colors and thereby prevent ghost images associated with excessively worn red pixels.

Figure 9:
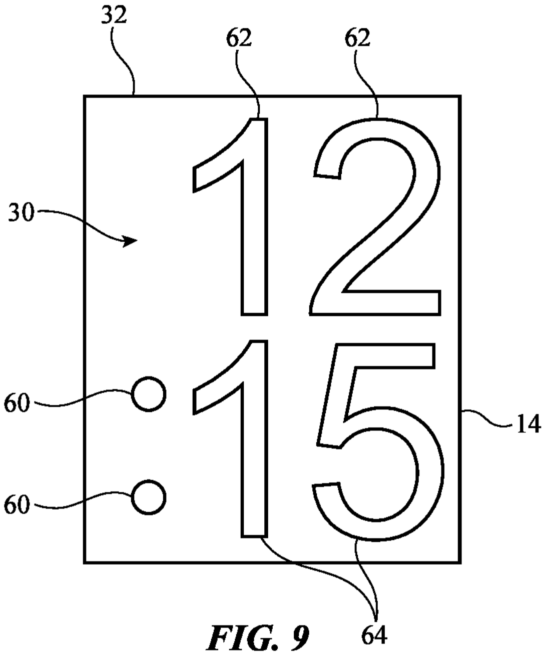
FIGS. 9 and 10 are diagrams of illustrative watch face images with respective higher and lower burn-in risks in accordance with embodiments.

If desired, control circuitry 20 can adjust watch face image 30 to reduce burn-in risk based on dynamic or predetermined artwork analysis. Consider, as an example, the arrangement of FIGS. 9 and 10. In the example of FIG. 9, background 32 of watch face image 30 may be black. Watch face image 30 may have an hour-minutes separator icon such as dots 60. Dots 60 may serve as a time separator that separates hour digits 62 from minute digits 64. This watch face design (particularly dots 60) is relatively static and therefore may exhibit a relatively high burn-in risk relative to the dynamic design of FIG. 10 that contains only rotating watch hands 42.

Figure 10:
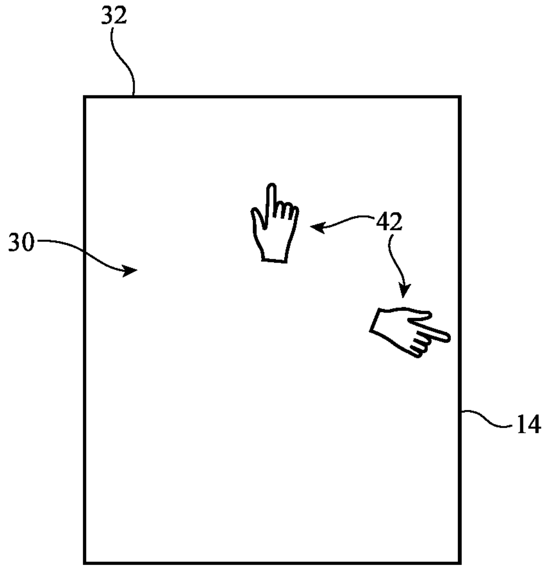

As the examples of FIGS. 9 and 10 illustrate, burn-in risk may be reduced by imposing a maximum dwell time constraint on displayed watch face elements. If desired, the design of watch face images can be analyzed in advance (e.g., by control circuitry 20 and/or control circuitry on external computing equipment). Based on this analysis, a burn-in risk metric can be developed (e.g., a burn-in-risk scale may be employed that ranges from 1 to 5, where 1 represents low burn-in risk of the type associated with moving hand designs of the type shown in FIG. 10 and 5 represents high burn-in risk of the type associated with static dots and nearly static numbers of the type shown in FIG. 9). Mitigation measures can then be taken based on the known burn-in risk of the watch face being displayed (e.g., reduced peak luminance values, shifting or otherwise altering the position of normally static elements across display 14 to reduce dwell times, time multiplexing different colors, altering watch element shapes and styles, etc.).

Figure 11:
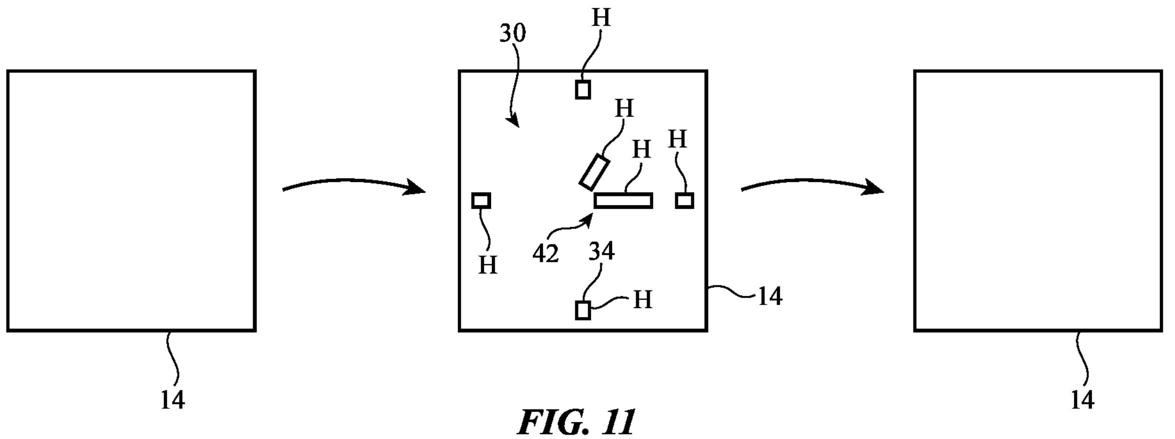
FIG. 11 is a diagram showing how a momentarily activated watch face image may have dynamic and static elements of equal intensity in accordance with an embodiment.
Figure 12:
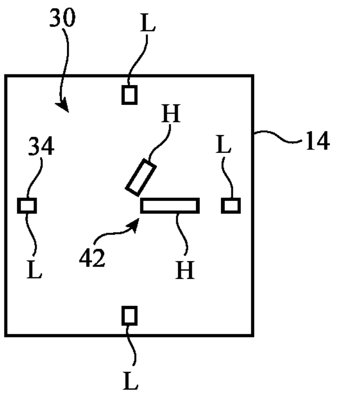
FIG. 12 is a diagram showing how a permanently activated watch face image may have static elements that are dimmer than dynamic elements in accordance with embodiments.

In some configurations, watch face image 30 may only be displayed in response to wrist movement that is detected with a motion sensor. For example, device 10 may be operable in a non-persistent watch face mode in which display 14 is normally off to conserve power and in which display 14 and watch face 30 are only activated in response to detection of wrist motion using a wrist motion sensor such as an inertial measurement unit in sensors 16 that has an accelerometer, compass, and/or gyroscope. This is illustrated in FIG. 11. Initially, as shown on the left-hand side of FIG. 11, display 14 may be off (e.g., no pixel light may be emitted) so that the content on display 14 is blank (e.g., black), thereby reducing power consumption. When a wrist movement is detected, display 14 may be momentarily turned on an display 14 may present watch face image 30 on display 14, as shown in the center of FIG. 11. After a predetermined fixed period of time sufficient to allow the user of device 10 to read the time indicated on watch face image 30 (e.g., 2-10 seconds, at least 3 seconds, at least 15 seconds, less than 1 m, or other suitable time), watch face image 30 may be replaced with a blank black background (e.g., display 14 may be turned off to conserve power as indicated on the right-hand side of FIG. 11). In this non-persistent watch face mode of operation, watch face image 30 is not displayed continuously and may therefore contain elements that are all displayed at a high luminance H (e.g., both indices 34 and hands 42 may be displayed at high intensity during the momentary activation of the watch face). In contrast, when device 10 is operated in a persistent watch face mode (e.g., an always-on-time mode in which watch face image 30 is displayed continuously), static indices 34 may be displayed at a lower luminance than dynamic hands 42 (e.g., static indices 34 may be displayed at a luminance L that is lower than the higher luminance H at which dynamic hands 42 are displayed) and/or other measures may be taken to reduce burn-in risk (e.g., measures such as making dynamic adjustments to persistent watch face elements such as radial position shifting, color cycling, size/shape variation, etc.).

Figure 13A:
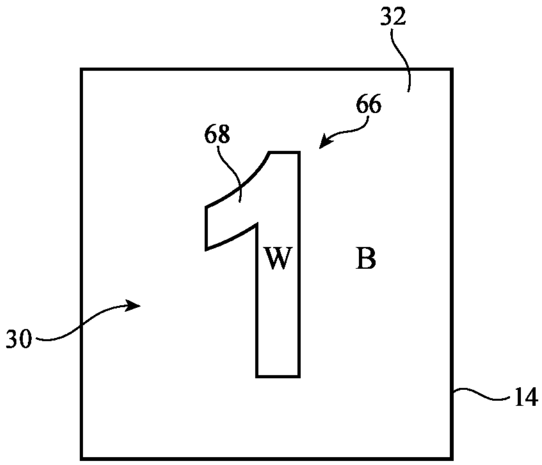
FIG. 13A shows an illustrative watch face element with a solid style in accordance with an embodiment.
Figure 13B:
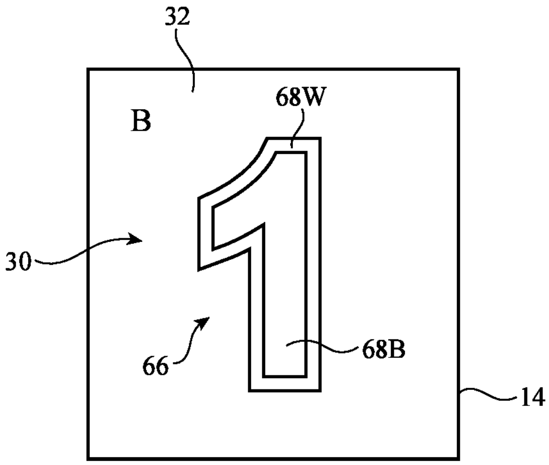
FIG. 13B shows an illustrative version of the watch face element of FIG. 13A with an outline style in accordance with an embodiment.

FIGS. 13A and 13B show how the style that is used by a watch face element may be varied to reduce burn-in risk. Watch face image 30 contains illustrative watch face element 66. Element 66 may be a static or dynamic element (e.g., indices, hands, complication information, time and/or date information, etc.). In the illustrative arrangement of FIG. 13A, element 66 has a solid style in which the body of element 66 is formed from a single solid set of pixels 68 (e.g., an unbroken group of adjacent pixels of the same or nearly the same intensity). Pixels 68 of element 66 of FIG. 13A may, for example, form a solid white body for element 66. Background 32 may be black. To reduce burn-in risk (proactively or in response to detected wear or other burn-in conditions during operation), element 66 may be presented using an outline style. This type of watch face element style is illustrated in FIG. 13B. As shown in FIG. 13B, when an outline style is used for element 66, element 66 may have a dark center portion (e.g., black pixels 68B) surrounded by a lighter border region (e.g., white pixels 68W). This type of style still allows element 66 to be readily viewed against the black pixels of background 32, but illuminates fewer pixels and therefore reduces pixel wear.

Figure 14A:
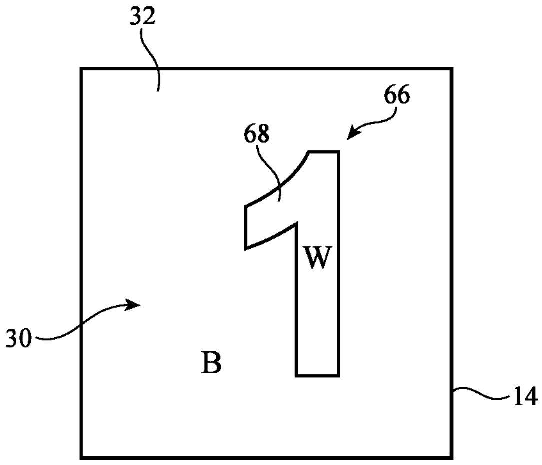
FIGS. 14A and 14B show respectively a positive watch face image and a compensating negative watch face image that may periodically be displayed in place of the positive watch face image to compensate for pixel wear from the positive watch face image in accordance with an embodiment.
Figure 14B:
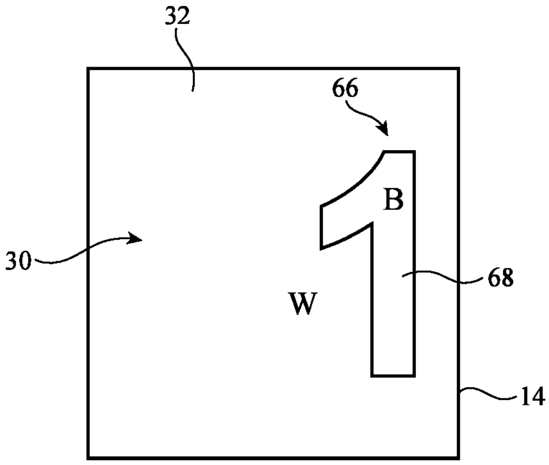

If desired, burnt-in areas of display 14 can be compensated by imposing complementary wear on less worn pixels in display 14. Consider, as an example, the arrangement of FIGS. 14A and 14B. In the example of FIG. 14A, watch face image 30 includes solid watch face element 66, formed from a solid area of white pixels 68 set against a solid area of black pixels in background 32. This arrangement will tend to create wear in the region covered by white pixels 68 and no wear in the remaining portion of display 14. To compensate for the wear due to pixels 68 of FIG. 14A, the polarity of watch face image 30 may periodically be reversed as shown in FIG. 14B. In particular, the solid area of pixels 68 in element 66 may be filled with black pixels and background 32 may be filled with white pixels. By presenting matching positive and negative watch face images for equal amounts of time, wear in the pixels of display 14 can be balanced and the risk of burn-in effects (e.g., ghost images) can be reduced. Both the positive and negative images may include time information, date information, watch face complications, and/or other watch face information.

In general, any suitable burn-in mitigation approaches may be used in device 10. For example, control circuitry 20 may impose burn-in constraints on displayed content such as watch face image content. The burn-in constraints may be constraints such as peak luminance controls, limits on displayed colors, watch face design selection limits (e.g., limits on watch face element style choices), dwell time limits and element positioning limits (e.g., requirements for static element shifting and/or other watch face element static and/or dynamic placement decisions), and/or may impose other constraints on watch face image elements. These approaches may be implemented based on pixel usage information or other display burn-in history information maintained in storage in control circuitry 20, may be based on other factors (e.g., temperature information, ambient light exposure information, etc.) and/or may be made without knowledge of factors such as these (e.g., without taking usage history and/or environmental data into account). One or more, two or more, three or more, or four or more of these approaches may be used in combination. For example, peak luminance limits may be used in any combination with color cycling, intelligent style selection, static element position shifting and/or other positioning techniques to prevent excess dwell time, element size and shape cycling, reverse image compensation techniques, and/or other burn-in mitigation techniques.

As described above, one aspect of the present technology is the gathering and use of information such as sensor information and display usage information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device, comprising:

a housing;

a wrist band coupled to the housing;

a display that is coupled to the housing and that has pixels; and control circuitry configured to use the display to continuously display a watch face image having hour indices distributed circumferentially around the watch face image and configured to dynamically shift a position of the hour indices on the display, wherein dynamically shifting the position of the hour indices on the display comprises repeatedly and gradually as a function of time shifting radial positions of the hour indices towards and away from a center of the watch face image while maintaining fixed circumferential positions of the hour indices, wherein the control circuitry is configured to maintain pixel usage history information for the pixels, and wherein the control circuitry is configured to use the usage history information to select a peak luminance constraint for the hour indices.

2. The electronic device defined in claim 1 wherein the watch face image has non-black portions with an overall size and wherein the control circuitry is configured to dynamically alter the overall size of the non-black portions to reduce burn-in risk.

3. An electronic device, comprising:

an organic light-emitting diode display having pixels; and control circuitry configured to continuously display a watch face image on the organic light-emitting diode display, wherein the watch face image comprises watch face indices and watch face hands, wherein the control circuitry is configured to reduce burn-in risk for the watch face indices by repeatedly and gradually as a function of time moving the watch face indices inwardly towards a center of the watch face image and outwardly away from the center of the watch face image while maintaining fixed circumferential positions of the watch face indices, wherein the control circuitry is configured to maintain pixel usage history information for the pixels, and wherein the control circuitry is configured to use the usage history information to select a peak luminance constraint for the watch face indices.

* * * * *